United States Patent [19]

Arnold, III

[11] Patent Number: 4,908,501
[45] Date of Patent: Mar. 13, 1990

[54] PORTABLE ELECTRICALLY HEATED ANIMAL DRINKING WATER CONTAINER

[76] Inventor: Morris A. Arnold, III, Rt. 2, Box 242I, Prairie du Chien, Wis. 53821

[21] Appl. No.: 260,000

[22] Filed: Oct. 19, 1988

[51] Int. Cl.⁴ .......................... A01K 7/00; H05B 3/56; A47J 27/21
[52] U.S. Cl. ...................................... 219/438; 119/73; 219/310; 219/311; 219/436; 219/535; 338/212
[58] Field of Search .................. 219/310–312, 219/436, 438–442, 435, 535, 544, 528; 338/212; 119/73

[56] References Cited

U.S. PATENT DOCUMENTS

| | | |
|---|---|---|
| 1,033,799 | 7/1912 | Harvey . |
| 1,378,256 | 5/1921 | Malhomme .......................... 219/436 |
| 2,265,295 | 12/1941 | Layton ................... 219/436 |
| 2,665,366 | 1/1954 | Cleveland . |
| 2,703,358 | 3/1955 | Mertler .......................... 219/436 |
| 2,838,650 | 6/1958 | Lehr .............................. 219/436 |
| 2,982,932 | 5/1961 | Morey ............................. 338/212 |
| 3,436,525 | 4/1969 | Stanford ....................... 219/535 |
| 3,648,659 | 3/1972 | Jones . |
| 3,820,508 | 6/1974 | Robinson . |
| 3,968,348 | 7/1976 | Stanfield .......................... 219/535 |
| 4,072,847 | 2/1978 | Craven .............................. 219/544 X |
| 4,320,721 | 3/1982 | Silcox . |
| 4,561,384 | 12/1985 | Liff .................................. 219/441 X |
| 4,640,226 | 2/1987 | Liff . |

OTHER PUBLICATIONS

"Heated Water Bucket", Dunn's Catalog, Fall 1988, p. 79.

Primary Examiner—Anthony Bartis
Attorney, Agent, or Firm—Lathrop & Clark

[57] ABSTRACT

A heated water vessel for providing drinking water for animals is provided which has a first exterior rubber container and a second rubber interior container wherein the second container is nested within the first, forming an enclosed air pocket between the first and second container. The two containers are sealed together with a breakable adhesive in order to allow the separation of the containers if necessary. An electric self-regulating heating cable is wrapped around the outer surface of the second container and in contact therewith in order to prevent the water within the inner container from freezing over during subfreezing temperatures. The enclosed air pocket does not contain any foamed or other type of insulation.

7 Claims, 1 Drawing Sheet

PORTABLE ELECTRICALLY HEATED ANIMAL DRINKING WATER CONTAINER

FIELD OF THE INVENTION

The present invention is directed to a container, and particularly a water container. The present invention is specifically directed to a portable heated water container, which purpose is to keep drinking water from turning to ice when the ambient temperature is below freezing.

BACKGROUND OF THE INVENTION

The necessity for providing drinking water to animals cannot be understated. Animals must have water in order to survive and to assist in converting solid feed into usable products for providing metabolizable energy to the animal.

In farming situations, water is generally fed to animals in the out-of-doors or in an open-air building, such as a livestock pavillion or a barn. When the air temperature is below freezing, the water in this environment will eventually freeze, preventing access to the water. To enable an animal in this situation to have water, the prior practice has been to break the ice cap on the surface of the water in order to gain access. Generally, the animal will nudge its nose against the ice to break it. Unfortunately, this practice must be maintained at a regular interval in order to prevent the ice cap from becoming too thick. In such situations, the animal will not be able to break the ice without, assistance. This requires the time of a person to constantly monitor drinking vessels during subfreezing temperatures.

In order to solve this dilemma, it has been the practice to provide an electrically heated container, which will maintain the water at above-freezing temperatures. Examples of such drinking vessels are as follows:

U.S. Pat. No. 1,033,799 to Harvey is directed to an electric water heater, which comprises an outside base member and an inside vessel. Situated within the vessel is a high-resistance heating coil enclosed in insulation. Additionally, there is a circuit breaker to maintain the temperature of the water.

U.S. Pat. No. 2,665,366 to Cleveland is directed to an open vat, which is electrically heated to provide water for animals. A continuous length of heating wire is passed around the bottom of the vat over positioned rods in order to form a series of closely arranged loops. The heating wires keep the contents of the vat thawed.

U.S. Pat. No. 3,648,659 to Jones is directed to an electrically heated bird bath, in which a heating unit is mounted in a recess next to bowl of the bird bath.

U.S Pat. No. 3,820,508 to Robinson is directed to a portable drinking bucket, specifically intended for a horse. The bucket contains an inner container and an outer container. An electric heating means is disposed between the inner and outer container. Insulation is provided around the heating means.

U.S. Pat. No. 4,640,226 to Liff is directed to a water apparatus containing spaced inner and outer walls. Situated between the walls is an electric heating means to keep the water device from thawing. The electric heating wires are coated with an insulation material.

U.S. Pat. No. 4,320,721 to Silcox is directed to an animal watering apparatus which includes an inner and outer wall, between which is placed an electric heating element. The electric heating element is disposed between insulation.

The Dunn's 1988 Catalog, page 79, is directed to a heated water bucket, which is disclosed as maintaining automatic temperature control. The inner bucket is stainless steel.

It has been found that many of these containers suffer from a variety of disadvantages. For example, the containers may be too large to allow easy portability. Therefore, the drinking vessel must be "permanently" placed at one location. This has the disadvantage of not allowing easy portability of drinking water to animals which may remain in sub-freezing temperatures, but out of the range of a drinking vessel. In order to compensate for this, a person must then bring the animal to the drinking water.

An additional deficiency is that many of the drinking containers of the prior art have exposed heating elements, which may either cause burns or electrical shock to the animal. Should this occur, the animal may become frightened of the vessel and refuse to go near it thus defeating the entire purpose of the apparatus.

In addition, many of the prior art heating vessels are equipped with insulation, generally in the form of fiberglass insulation, which is packed around the heating elements. Examples of such prior art heating vessels are disclosed in U.S. Pat. Nos. 1,033,799 to Harvey; 3,820,508 to Robinson; 4,640,226 to Liff; and 4,320,721 to Silcox, all of which have been previously described. Although insulation may have been described as having heat beneficial qualities, the inventor has discovered that packed insulation can be detrimental to a heated water container. The heating of the elements causes water in the air to condense on the insulation. In sub-freezing weather, the condensed water on the regions of the fiberglass farthest from the heating elements will freeze. The freezing effect will cool the water container thus requiring more heat energy output from the heating elements.

SUMMARY OF THE INVENTION

It is therefore an object of the present invention to provide a heated water container which obviates the above-mentioned disadvantages.

It is also an advantage of the present invention to provide a heated water container, which is self-contained, easily portable, and prevents water from freezing at temperatures down to −20° F.

These and other objects of the present invention are defined by a portable drinking apparatus comprising a first or exterior container having a first upper edge, a first side wall and a first bottom wall, and a second or interior container having a second upper edge, a second side wall and a second bottom wall, wherein the second side wall has an exterior surface and an interior surface. The second or inner container is made of rubber, which is safe and nonconductive. The inner container preferably has smooth, roll-over edge. The second container is nested in spaced relationship within the first container. The spaced relationship creates an enclosed uninterrupted air pocket between the side walls and the bottom walls of the first and second container.

The drinking container also includes an electric heating means extending along the outer surface of the second side wall. The heating means is preferably a heating cable attached to the inner rubber pail, which provides a necessary "safety" element because the cable cannot conduct electricity through the rubber pail.

Advantageously, the portable drinking apparatus of the present invention avoids the use of any insulation in the air pocket. No insulation, either foamed or otherwise, is needed because insulation interferes with the heating process by creating condensation and ice in the air pocket area and therefore frost on the exposed part of the rubber pail where there is no water. By avoiding insulation, the manufacturing process is simplified and the expense of creating the container of the present invention is reduced.

The portable drinking container is preferably provided with a heavy-duty bail or handle, thus making it easily portable.

Further objects, features and advantages of the invention will be apparent from the following detailed description when taken in conjunction with the accompanying drawings.

DETAILED DESCRIPTION OF THE INVENTION

Figure 1:
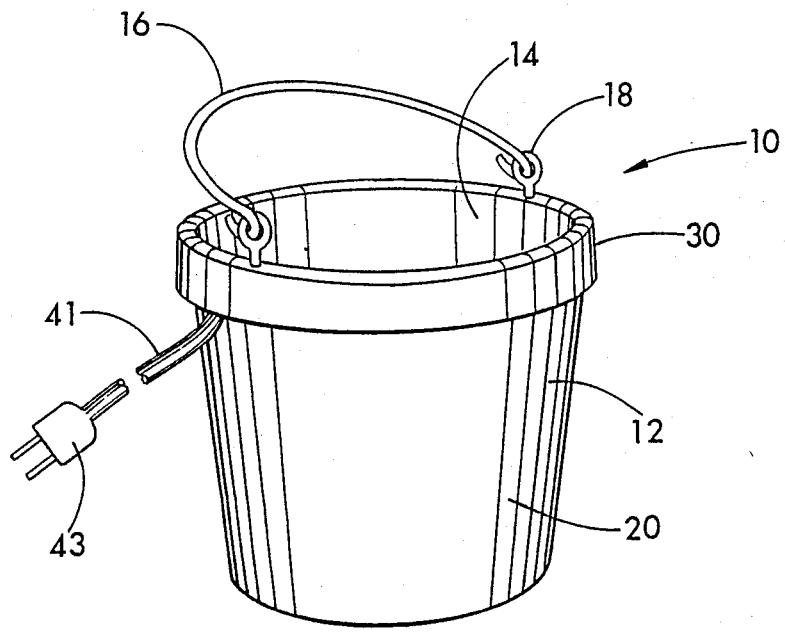
FIG. 1 a perspective view of the portable drinking container of the present invention.

Reference is now made to the drawings, wherein the same numbers will be given to similar features throughout. Referring now to the figures, there is disclosed the drinking container 10 of the present invention. The drinking container 10 is a bucket or pail-shaped container suitable for holding a liquid, preferably water. The drinking container 10 includes an exterior or first container 12 and an interior or second container 14. A bail or handle 16 is rotatably connected to upwardly projecting loops or ears 18, which extend from the second container 14.

The first container 12 includes a downwardly depending side wall 20, a bottom wall 22 and an upper edge or lip 24. It is preferred to mold the first container 12 in a single piece. The first container 12 is preferably made of a high impact material to protect the drinking container 10 during normal use. It is expected that the drinking container 10 will receive harsh treatment in farm-type settings. For example, it is foreseeable that the drinking container 10 will be banged around during the filling process and kicked by animals when it is placed in a livestock pen. Therefore, the first container should be made of a material sufficient to withstand such abuse. One such material is galvanized steel, preferably 26–31 gauge hot dipped galvanized steel. This material is known in the bucket industry to withstand certain amounts of abuse. A preferred outer material is high impact rubber, which will not only withstand abuse, but will be less inclined to deform or dent. Additionally, by utilizing rubber as an outer material, the bucket will be less conductive to electrical charges — and safer for animals.

The second container 14 is preferably a single piece of natural or synthetic vulcanized rubber. It may or may not be reinforced by natural or synthetic textile fibers incorporated and evenly distributed in the rubber mass. An example of a preferred second container 14 is described in U.S. Pat. No. 2,620,006 to Sorron-Zabala, which is incorporated herein by reference for a description of the second container. The second container construction is preferably of a non-porous rubber, which resists the effect of heat and cold and is easy to clean. It is preferred that the second container 14 be made of a one-piece molding and have no corners to trap dirt, no seams to split and edges rounded for safety. The second container 14 includes a side wall 26, a bottom wall 28 and a "roll-over" rim 30.

The roll-over rim 30 comprises an outwardly extending surface 32 and a downwardly extending surface 34. In the annular space 36 defined by the outwardly extending surface 32 and the downwardly extending surface 34, a metal ring 38 may be placed which extends along the circumference of the upper edge of the second container below the outwardly extending surface 32. The metal ring 38 forms the two upwardly extending loops 18, which pass through slits provided in the outwardly extending surface 32 to allow for the attachment of the handle 16. The handle 16 is a heavy-duty handle, preferably made of steel, for carrying or attaching the drinking vessel 10 to a support on a wall, fence or the like.

The preferred construction of the second container 14 is that of reinforced seamless "molded rubber" or rubber-polyethylene. Rubber has been found to be safer to use in a drinking vessel due to its inability to conduct electricity. Additionally, it is preferred that the color of the rubber be black in order to absorb solar heat to more efficiently and effectively warm the contained liquid.

The term "portable" is intended to define a drinking container, which can be carried from one location to another with some ease. Preferably, the drinking container 10 of the present invention 10 will be easily portable by one person. In this manner, it is within the scope of the present invention to define the drinking container 10 to be a vessel having a capacity of 12 to 14 quarts, although the vessel may be larger or smaller as needed.

Figure 2:
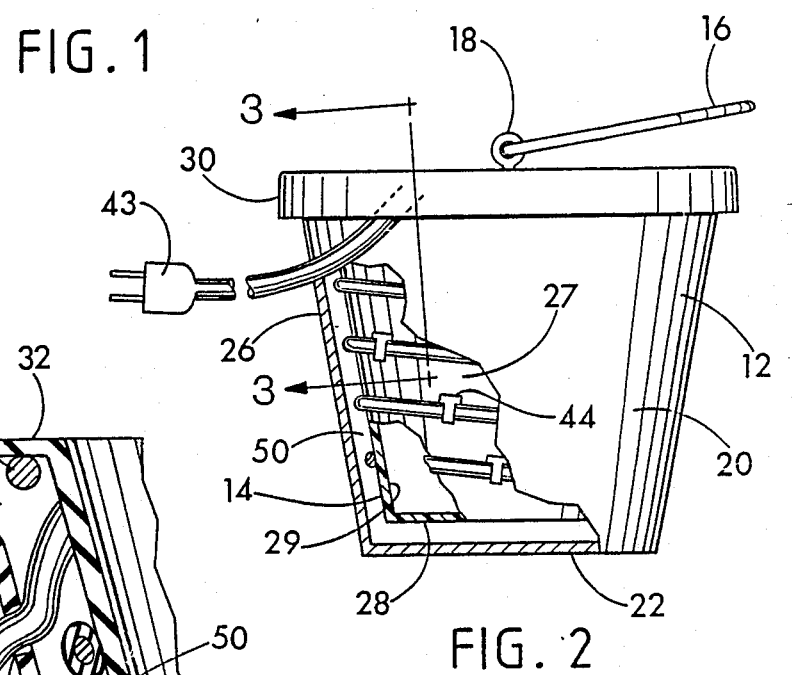
FIG. 2 is a partial cross-sectional, side elevated view of the portable drinking container of the present invention.
Figure 3:
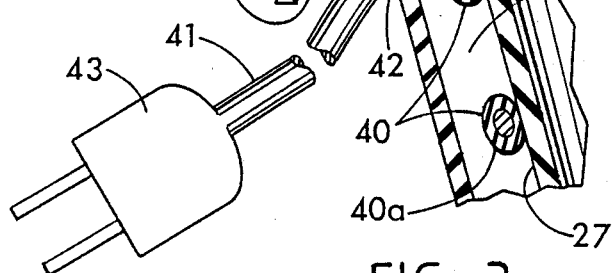
FIG. 3 cross-sectional view of a portion of the portable drinking container taken along lines 3—3 of FIG. 2.

Referring now to FIGS. 2 and 3, there is provided an electric heating means in the form of a heating cable 40 which is helically wound around the outer surface 27 of the side wall 26 of the second container 14. Such heating cables are known to the art for providing heat to pipes to prevent pipeline freezing. An example of a heating cable which may be used in the present invention is a Frostex® pipe heating cable by Raychem Corporation, Menlo Park, Calif. The heating element 40 automatically self-regulates its heat output and therefore needs no thermostat. A preferred heating cable for the present invention will operate on an electric current of 120 volts AC and provide 3 watts heat output per foot of cable. The heating cable 40 includes a distal end and a proximal end. The proximal end of the heating cable 40 is located adjacent an attached electric cord 41, which purpose is to conduct electricity from an electric outlet through a plug 43 to the heating cable 40.

The heating cable is preferably wound around the outer surface 27 of the second container 14 approximately six revolutions, exiting at the top of the outer pail through a side seam 42. For a 12 quart second container 14, approximately 15 feet of heating cable will suffice. Of course, it is within the scope of the present invention to provide more or fewer revolutions of the heating cable around the container 14 as needed, depending upon the climate conditions. At 3 watts per foot of heat output, a 15 foot cable will generate 45 watts of heat output. The heating cable 40 is provided with a housing 40a, preferably made of rubber or a non-conductive material. The housing 40a increases the safety of the drinking container 10 because the electrically insulated heating cable 40 surrounds and is adjacent the outer surface 27 of a non-conductive rubber container 14, which also cannot conduct electricity.

The heating cable 40 is preferably attached to the second container 14 by clips 44, which are evenly spaced around the outer surface 27 of the inner pail 14. The clips are preferably plastic adhesive cord clips, in which the backing is an adhesive foam which adheres to the outer surface 27 of the second container 14. An example of such a metal adhesive cord clip is produced by the Panduit Corporation, Tinley Park, Ill. Alternatively, the heating cable 40 may be adhesively adhered directly to the outer surface 27 of the container 14.

Referring now particularly to FIGS. 2 and 3, the construction of the vessel 10 of the present invention will be described. Prior to nesting the second container 14 within the first container 12, the electric heating cable 40 must be attached to the outer surface 27 of the second container 14. This is accomplished by first adhesively mounting the clips 44 in a defined, spaced relationship to the outer surface 27 of the second container 14. The electric heating cable 40 is then mounted on the outer surface 27 of the second container 14 via the clips 44. The distal end of the heating cable is mounted onto the second container 14 at a location near to or adjacent the bottom wall 28 of the second container 14. The heating cable is then wound around the second container 14 in an upward direction in a fashion as illustrated in FIG. 2. The end of the heating cable, which is connected to the electric cord 41 is positioned near or adjacent the upper rim 30 of the second container 14. In this manner, the second container 14 is provided with an electrically heated system which will prevent the contained liquid from freezing in subfreezing temperatures.

The second container 14 and the first container 12 are then nested together with the roll-over rim 30 of the second container 14 enclosing the upper lip 24 of the first container 12. An aperture 42 is preferably provided in the side wall 26 near the upper lip 24 to allow passage of the electric cord 41 to the exterior of the vessel 10. Alternatively, the cord 41 can pass between the upper lip 24 of the first container 12 and the roll-over rim 30 of the second container 14. The second container 14 and the first container 12 are then sealed at the location 46, where the upper lip 24 meets the inner surface 35 of the downwardly extending portion 34 of the rim 30. Although there are a variety of methods to seal the pails together, a preferred sealant is silicone sealant, which is a nonporous sealant, thus preventing air or liquid from traversing the sealed location 46. Should the heating cable 40 malfunction, it can be relatively easily replaced by breaking the silicone seal, separating the containers 12, 14, and replacing the old heating cable with a new one.

The union of the two containers 12, 14 makes the drinking container 10 a singular unit and defines an air pocket 50 between the first container 12 and the second container 14. The air pocket 50 preferably extends along the sides and bottom of the drinking container 10.

The electric cord 41 preferably terminates at a standard electric plug 43, which may be conveniently plugged into any electrical outlet, preferably a ground-fault outlet, or, if the location of the pen is a sufficient distance from the electrical outlet, an extension cord. The electric cord 41 is preferably covered with a tough "chew-resistant" rubber or flexible conduit to discourage animal chewing and to protect the animal from electric shock. It is additionally within the scope of the present invention to provide an electric cord 41 of any convenient length.

In this manner, water may be conveniently disposed within the inner surface 29 of the second container 14. The drinking container 10 may then be transported via the handle 16 to the desired location. In subfreezing temperatures, the plug 43 is then plugged into an electric outlet, which activates the electric heating cable 14 to heat the inner surface 29 of the second container 14. In this manner, the water will remain free from icing over while it is in the vessel 10. Further, due to the composition of the second container 14 and the heating cable 40, there is substantially no chance of creating an electric shock to the user animal. Further still, the automatic thermostat control of the heating cable 40 may be conveniently adapted to prevent the vessel 10 from overheating.

It is an added and unexpected advantage of the present invention that the air pocket 50 is not provided with any foamed insulation. It has been found that the presence of insulation reduces the efficiency of the drinking container 10 by creating condensation and ice in the "air pocket" area 50. Frost may then appear on the exposed inner surface 29 of the second container 14 where there is no water.

It is understood that the invention is not confined to the particular construction and arrangement herein illustrated and described, but embraces such modified forms thereof as come within the scope of the following claims.

What is claimed is:

1. A portable heatable water vessel for providing drinking water for animals and adapted to prevent water from freezing at temperatures to −20° F., the water vessel comprising:
   (a) a first exterior container having a first upper edge, a first side wall and a first bottom wall, the first exterior container being made of rubber;
   (b) a second interior container having a second upper edge, a second side wall and a second bottom wall, wherein the second side wall has an exterior surface and an interior surface, the second side wall being made of rubber, wherein the second container is nested in spaced relationship within the first container such that the second upper edge comprises a roll-over rim which extends over the first upper edge, wherein the spaced relationship creates an enclosed uninterrupted air pocket between the side walls and bottom walls of the first and second container, wherein the first and second container are nested together in sealing engagement, and wherein the first and second containers are sealed together by a nonporous breakable adhesive; and
   (c) an electric heating cable wrapped around the exterior surface of the second side wall and in contact therewith to provide heat to the vessel.

2. The portable heatable water vessel of claim 1 further comprising a handle attached to the roll-over rim of the second interior container.

3. The portable heated water vessel of claim 2 wherein the handle is attached to the roll-over rim by two upward extending metal loops passing through a slits provided in the roll-over rim, the metal loops being connected to a metal ring extending along the circumference of the second container below the upper edge of the second container.

4. The portable heatable water vessel of claim 1 wherein the electric heating cable is held in contact with the outer surface of the second side wall by means of clips.

5. The portable heatable water vessel of claim 1 wherein the adhesive sealing together the first and second containers is a silicone adhesive.

6. The portable heating element of claim 1 wherein the heating cable is self-regulating.

7. The portable drinking vessel of claim 1 wherein the electric heating cable is detachably connected to an electric cord, the electric cord being covered with a chew resistant conduit material.

* * * * *